(12) United States Patent
Smith

(10) Patent No.: US 6,931,661 B2  
(45) Date of Patent: Aug. 16, 2005

(54) DYNAMIC IMAGE PROVISIONING

(75) Inventor: Edwin Derek Smith, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 1127 days.

(21) Appl. No.: 09/756,575

(22) Filed: Jan. 8, 2001

(65) Prior Publication Data

US 2002/0092029 A1 Jul. 11, 2002

Related U.S. Application Data

(60) Provisional application No. 60/241,731, filed on Oct. 19, 2000.

(51) Int. Cl.[7] .............................. G09G 5/00; H04M 1/00
(52) U.S. Cl. ........................ 725/133; 725/141; 725/153; 345/626; 455/550.1; 455/575.3
(58) Field of Search ................................ 725/105, 133, 725/141, 153; 345/626; 348/63, 345; 455/403, 422

(56) References Cited

U.S. PATENT DOCUMENTS

| | | | | |
|---|---|---|---|---|
| 6,009,336 A | * | 12/1999 | Harris et al. ................. | 455/566 |
| 6,385,772 B1 | * | 5/2002 | Courtney ..................... | 725/105 |
| 6,487,396 B1 | * | 11/2002 | Sassi .......................... | 455/90.1 |
| 6,522,347 B1 | * | 2/2003 | Tsuji et al. .................. | 715/848 |
| 6,526,296 B1 | * | 2/2003 | Nieminen ................. | 455/575.3 |
| 6,631,522 B1 | * | 10/2003 | Erdelyi ......................... | 725/53 |
| 6,731,326 B1 | * | 5/2004 | Bettinardi .................... | 348/63 |

* cited by examiner

*Primary Examiner*—Krista Bui  
(74) *Attorney, Agent, or Firm*—Sylvia Chen; Daniel C. Crilly; Dale W. Dorinski

(57) ABSTRACT

A method of transmitting an image from a remote server to a portable device and dynamically viewing, by a human observer, the transmitted image on a display of the portable device. On a remote server, a master set of data representative of a graphic image (30) is processed to form a first subset of data representative of a portion of the graphic image. The data is transmitted to the portable device (49) and drawn on the display (34). The user selects a portion of the image to be further expanded and the master database is again processed to form a second subset of data representative of the selected portion of the image. The second subset of data is transmitted to the portable device and drawn (36) on the display.

16 Claims, 4 Drawing Sheets

*FIG. 2a*  *FIG. 2b*
*FIG. 2c*  *FIG. 2d*
*FIG. 2e*  *FIG. 2f*

DYNAMIC IMAGE PROVISIONING

CROSS REFERENCE TO RELATED APPLICATIONS

This application claims the benefit of U.S. Provisional Application No. 60/241,731, filed Oct. 19, 2000, and assigned to Motorola, Inc.

TECHNICAL FIELD

This invention relates in general to display technology and imaging software, and more particular to a dynamic interface tailored for viewing images on portable devices, especially in a wireless network environment.

BACKGROUND

Handheld devices such as cellular phones, two-way radios and PDA's typically have relatively limited display capabilities resulting from portability design constraints. This limits the value of image viewing applications for the user. Although an original image source may be of a high fidelity, much of this content is sacrificed when translated for the limited size, resolution and color depth of a portable display. If greater detail is desired, the user zooms in by viewing a subset of the original image at a greater magnification. A key metric is the pixel density of the portable display relative to the pixel density of a high quality original image. Many of these portable devices are wirelessly enabled and images may be transmitted in digital form to the device when needed. The bandwidth limitations of current wireless systems also add to the design constraints for handheld imaging applications. While future networks such as 3G and 4G will provide higher transmission bitrates, speed and network capacity will continue to be dominant issues for the foreseeable future.

In addition to display and wireless connection limitations, mobile devices typically are limited with regard to memory capacity. Given the vast number of images that a user may wish to view, and the potential dynamic nature of the images (e.g. weather or traffic maps, real time images, etc.), it is not practical to store the images locally within the device to avoid the wireless connection constraints. The present invention provides the user with a dynamic display interface tailored for viewing images on portable wireless devices, especially in a wireless environment.

BRIEF DESCRIPTION OF THE DRAWINGS

FIG. 2 illustrates a "zoom in" sequence.

DETAILED DESCRIPTION OF THE PREFERRED EMBODIMENT

Figure 1:
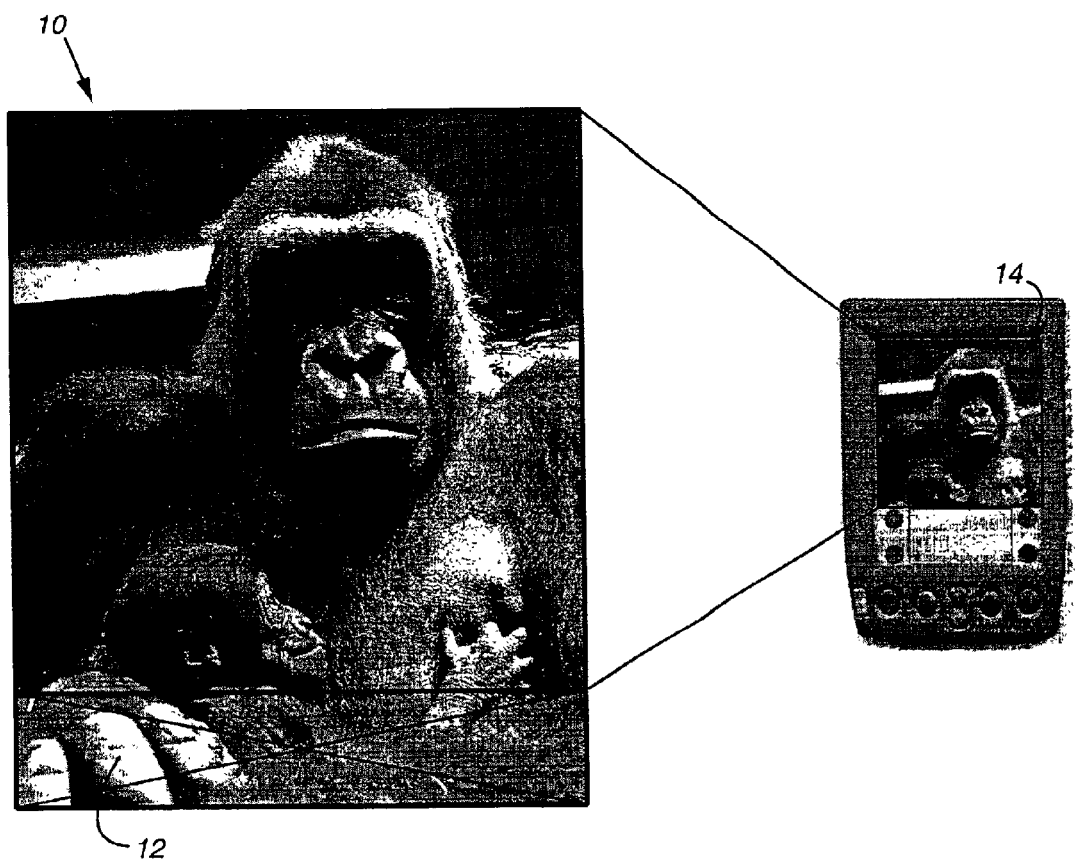
FIG. 1 illustrates a high quality image that is filtered prior to transmitting it to the mobile display.

While the specification concludes with claims defining the features of the invention that are regarded as novel, it is believed that the invention will be better understood from a consideration of the following description in conjunction with the drawing figures, in which like reference numerals are carried forward.

The invention is most useful when the original image processed by the remote server is of substantially higher resolution than that of the portable display. Zoom functions are used to access greater detail, and the portable device's display resolution must be equal or less than the original image density for additional content to be transmitted to the user. Benefits of further magnification are dependent upon physical perceptual capabilities and not the transmission of new information, and can be accomplished locally using traditional techniques, performed by the device processor (if available).

An application residing on the mobile device interfaces with a corresponding application on a network server. The integrated nature of this client/server model is fundamental to the improvement over the current state of the art. The mobile application provides a user interface for selecting, viewing and manipulating images transmitted to the device. This interface will vary according to the capability of the device (display size, color depth, touch screen option, etc.). The server application utilizes the Internet or other network to retrieve the original image if not stored locally, performs image processing functions, calculates probabilities for what information may be requested next by the mobile user, and sends appropriate data to the client device that is viewed by the user. The applications calculate the connection speed and optimize the image provisioning based upon user preferences. These preferences may include imaging performance, cost minimization and the like.

Referring now to FIG. 1, the high quality color image 10 on the left measures 1157 pixels wide by 1392 pixels high. The image must be translated for the Palm Computer display 14 on the right that is used for this particular example, which measures 160 pixels square (25,600 pixels) and is only capable of displaying a grayscale image. It is not practical to transmit the original image over the wireless network, which in this case is more than one megabyte in size (1.6 megapixels), and would require significant processing on the mobile device. Instead, the server application crops the image by, for example, deleting the area 12 at the bottom of the image (to utilize the full width of the mobile display, although the largest dimension could also be scaled down to retain the full image boundary), reduces its size and color depth, and then transmits the relatively small image to the device.

Referring now to FIGS. 2a–2f, this sequence of filtering and transmitting is repeated for a zooming sequence. The total number of bytes transmitted for each zoom can be fairly low relative to the original image, while the potential to dig in to get additional detail is maintained. The wrinkled face of the three day old gorilla cannot be distinguished from the first images 2a, 2b scaled to fit the small portable display, however, continued zooming in 2c–2f and allocating the small display to progressively smaller segments of the original image, this detail emerges. In this example, the touch screen capability is utilized to indicate the center location of the next segment to display, and the zoom is increased by a factor of 2. Other zoom rates could be set through user preferences.

Figure 3:
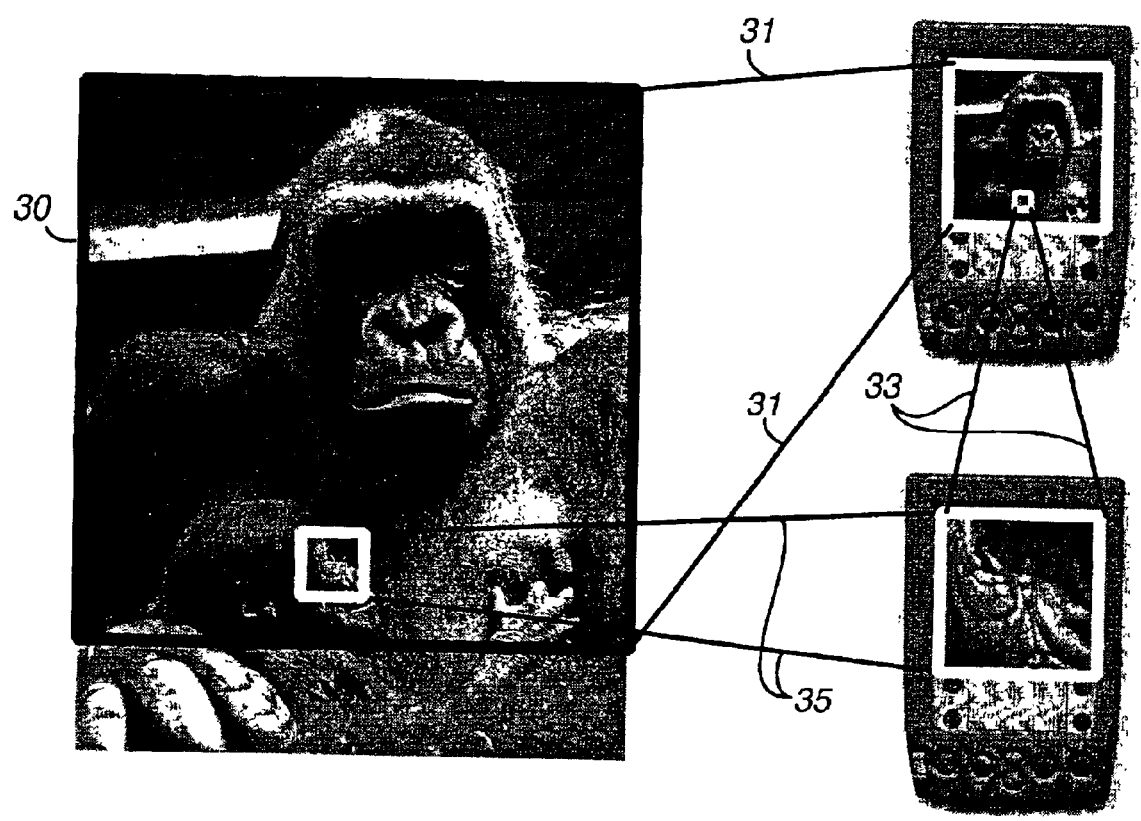
FIG. 3 illustrates the dynamic relationship between the original image and the changes viewed by the user on the mobile display.

Referring now to FIG. 3, the diagram illustrates the dynamic nature of image provisioning that occurs using this method. The original image 30 on the left is processed on the server and transmitted, and the Mobile Terminal is used to determine the segment of the original image that is filtered and transmitted to the display 34, 36. Lines 31 depict the relationship between the original image 30 resident on the server and the image 34 that is first displayed on the portable wireless device. Lines 35 depict the relationship between the original image 30 resident on the server and the image 36 that is ultimately displayed on the device. Lines 33 depict the relationship between the two zoomed views on the device. While this example used a Palm Computer with a touch display showing a "zoom in" user interface mode, other means could be employed such as button presses, a visual "cursor" positioned at the center point of the zoom, physical movement coupled with accelerometers in the device and so on. The user is presented with an interface that is easy to use, and the client/server application performs the filtering and transmission functionality.

The resolution of the "eye/nose" image 36 on the portable device in the lower right of FIGS. 2f and 3 has reached maximum zoom, and the pixel density in the display is equal to the pixel density of the original image. Zooming in further may benefit the user, but no new information needs to be transmitted, as the pixel density of the display is now equal or greater than the pixel density of the original image for this small region.

The functionality of this sequence is similar to systems such as Mapquest that use the Internet to transfer street map information at various levels of zoom, however, Dynamic Image Provisioning optimizes each transmitted image according to the particular device capabilities on which images are viewed. The addition of predictive algorithms that consider transmission speed, user behavior, cost and other factors is a further improvement over current systems. These improvements significantly impact the problem of network latency between each zoom, pan, etc, and are especially useful for wireless systems.

Figure 4:
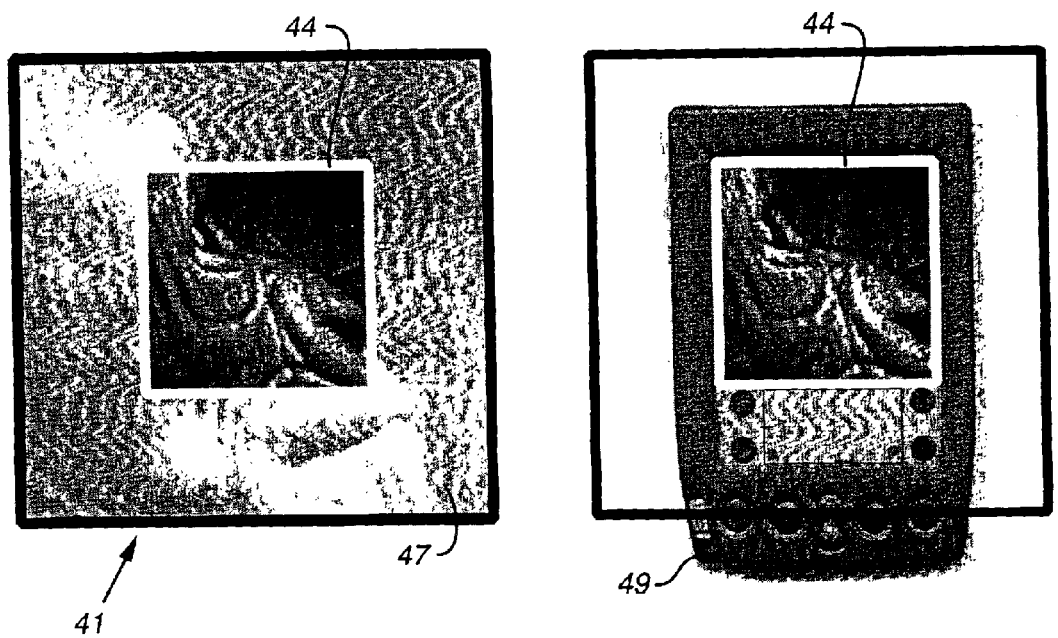
FIG. 4 illustrates the use of a virtual page for caching image information that may be called upon by the user.

Referring now to FIG. 4, a "Virtual Page" is illustrated to show how a predictive algorithm would be employed. A virtual page is established in the mobile device memory that is substantially larger than the physical number of display pixels. While the user is viewing the displayed image 44, additional image data 47, starting with that closest to the physical borders of the displayed image 44, is transmitted to the device 49 to fill in the virtual page 41. This is particularly useful when the user employs a panning function, as the information immediately surrounding the displayed image is available and must only be repositioned. This use of cached image data provides a user experience that is substantially improved over the present state of the art for wireless handheld devices, as transmission delays are mitigated. A predictive algorithm is used to estimate a probability for the direction the user may pan next, and transmits image data in that virtual page region prior to filling another region with a lower probability. A similar predictive mechanism is utilized for zoom functionality.

Figure 5:
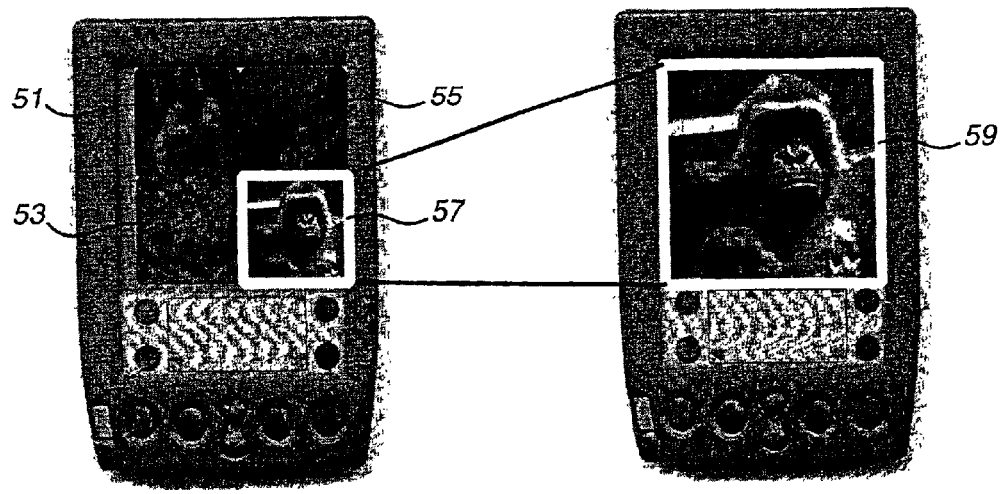
FIG. 5 illustrates a thumbnail image viewing application.

Referring now to FIG. 5, a "thumbnail image" method is described. A thumbnail viewing application is a specific application of the above system. In this example, the display has been segmented into four regions 51, 53, 55, 57, each containing an 80 pixel square grayscale image (one of which 57 is the baby gorilla and its mother used in the previous example). The user has two choices: either select one of the images 51, 53, 55, 57 to view at a larger magnification; or to scroll up or down to another set of thumbnail images. Predictive image provisioning occurs while in the thumbnail view based upon a model of user behavior.

One usage mode might be to scroll through many thumbnail views, rarely selecting an image of interest (e.g. a browse mode). In this case, as soon as one set of thumbnails is transmitted (and displayed), transmission of the next set of thumbnails begins and is retained in memory (using a virtual page or other means), ready for immediate view when the user scrolls to the next set. A second usage mode is one in which the user often selects an image to see more detail. In this case, the larger image for each thumbnail is transmitted and retained in memory. When the user taps on a thumbnail 57 for a larger view with additional detail, it is immediately displayed 59 from memory.

The digital nature of the image allows for probabilities to be assigned to each pixel or image segment, and the limited wireless resources shared against this dynamic probability set. An optimized control method for the client/server application is useful in such a system for reducing the transmission of redundant information, thus minimizing potential cost and mitigating the consumption of limited wireless infrastructure capacity. To further reduce apparent latency, impartial images are displayed as the data is received, using progressive scan technology similar to that in the JPEG standard. A signal indicates to the user when the transmission is complete and no further image improvement should be expected.

The present invention is well suited to viewing images, faxes, pdf files, street maps, architectural drawings, and other such content in a mobile environment. In addition, the use of a client/server model provides an opportunity for new services in which "images" are stored on a server and provisioned to users upon request. These data files may belong to the user, be public, or be shared by a workgroup.

This invention has the potential to be used for future cellular phone products. Wireless PDA's benefit from this invention by providing the application as part of the device purchase or as an application added to the device at some later time.

While the preferred embodiments of the invention have been illustrated and described, it will be clear that the invention is not so limited. Numerous modifications, changes, variations, substitutions and equivalents will occur to those skilled in the art without departing from the spirit and scope of the present.

I claim as my invention:

1. A method of transmitting an image from a remote server to a portable device and dynamically viewing, by a human observer, the transmitted image on a display of the portable device, comprising:
   a) processing, on the remote server, a master set of data representative of a graphic image to form a first subset of data representative of a portion of the graphic image;
   b) transmitting the first subset of data to the portable device;
   c) rendering, on the display of the portable device, a first image created from the transmitted first subset of data;
   d) selecting, by the observer, a portion of said rendered first image, to be further expanded;
   e) sending a request indicative of said selected portion, from the portable device to the remote server;
   f) on the remote server, fulfilling said request and processing said master set of data to form a second subset of data representative of said selected portion of said first image;
   g) transmitting the second subset of data to the portable device; and
   h) rendering, on the display of the portable device, a second image created from the transmitted second subset of data.

2. The method of transmitting an image from a remote server to a portable device as described in claim 1, further comprising the steps of:

i) selecting, by the observer, a portion of said rendered second image, to be further expanded;

j) ending a request indicative of said selected portion of the second image, from the portable device to the remote server;

k) on the remote server, fulfilling said request and processing said master set of data to form a third subset of data representative of said selected portion of said second image;

l) transmitting the third subset of data to the portable device; and m) entering, on the display of the portable device, a third image created from the transmitted third subset of data.

3. The method of transmitting an image from a remote server to a portable device as described in claim 2, wherein the third subset of data is smaller than the master subset of data.

4. The method of transmitting an image from a remote server to a portable device as described in claim 1, wherein the first subset of data is smaller than the master set of data.

5. The method of transmitting an image from a remote server to a portable device as described in claim 1, wherein the second subset of data is smaller than the master subset of data.

6. The method of transmitting an image from a remote server to a portable device as described in claim 1, wherein the remote server is a part of the internet.

7. The method of transmitting an image from a remote server to a wireless portable device as described in claim 1, further comprising the steps of:

i) selecting, by the observer, a portion of said rendered second image, to be further expanded;

j) sending a request indicative of said selected portion of the second image, from the wireless portable device to the remote server;

k) on the remote server, fulfilling said request and processing said master set of data to form a third subset of data representative of said selected portion of said second image;

l) transmitting the third subset of data to the wireless portable device; and m) rendering, on the display of the wireless portable device, a third image created from the transmitted third subset of data.

8. The method of transmitting an image from a remote server to a portable device as described in claim 7, wherein the third subset of data is smaller than the master subset of data.

9. A method of transmitting an image from a remote server to a wireless portable device and dynamically viewing, by a human observer, the transmitted image on a display of the wireless portable device, comprising:

a) processing, on the remote server, a master set of data representative of a graphic image to form a first subset of data representative of a portion of the graphic image;

b) transmitting the first subset of data to the wireless portable device;

c) rendering, on the display of the wireless portable device, a first image created from the transmitted first subset of data;

d) selecting, by the observer, a portion of said rendered first image, to be further expanded;

e) sending a request indicative of said selected portion, from the wireless portable device to the remote server;

f) on the remote server, fulfilling said request and processing said master set of data to form a second subset of data representative of said selected portion of said first image;

g) transmitting the second subset of data to the wireless portable device; and h) rendering, on the display of the wireless portable device, a second image created from the transmitted second subset of data.

10. The method of transmitting an image from a remote server to a portable device as described in claim 9, wherein the first subset of data is smaller than the master set of data.

11. The method of transmitting an image from a remote server to a portable device as described in claim 9, wherein the second subset of data is smaller than the master subset of data.

12. The method of transmitting an image from a remote server to a portable device as described in claim 7, wherein the remote server is a part of the internet.

13. A method of transmitting an image from a remote server to a wireless portable device and dynamically viewing, by a human observer, the transmitted image on a display of the wireless portable device, comprising:

a) transmitting a graphic image from the remote server to the wireless portable device, and transmitting additional data representative of portions immediately surrounding the borders of the graphic image;

b) rendering the graphic image on the display of the wireless portable device, and retaining said transmitted additional data in a cache in the wireless portable device;

c) panning, by the observer, the displayed image in a direction;

d) rendering a new version of the displayed image representative of the panned direction, using the cached data;

e) sending a request indicative of said panned direction, from the portable device to the remote server; and f) on the remote server, fulfilling said request and transmitting additional data representative of portions immediately surrounding the borders of said new version of the graphic image.

14. The method of transmitting an image from a remote server to a portable device as described in claim 13, wherein a predictive algorithm estimates the direction the observer will make additional panning, based on the direction of previous panning.

15. A method of transmitting images from a remote server to a wireless portable device and dynamically viewing, by a human observer, the transmitted images on a display of the wireless portable device, comprising:

a) transmitting a plurality of graphic images having a first resolution, from the remote server to the wireless portable device;

b) processing, on the wireless portable device, the transmitted images to create a corresponding plurality of thumbnail images at a second resolution, said second resolution being lower than said first resolution;

c) rendering the plurality of transmitted graphic images on the display of the wireless portable device in thumbnail format;

d) selecting, by the observer, one of the plurality of rendered graphic images for further magnification; and e) rendering the selected image on the display of the wireless portable device at the first resolution.

16. A method of transmitting an image from a remote server to a wireless portable device and dynamically viewing, by a human observer, the transmitted image on a display of the wireless portable device, comprising:

a) transmitting a plurality of graphic images in thumbnail format, from the remote server to the wireless portable device;
b) rendering the plurality of transmitted graphic images on the display of the wireless portable device;
c) transmitting a graphic image representative of each of the thumbnail images to the wireless portable device, said representative image being of larger magnification than the thumbnail image;
d) retaining the transmitted larger magnification image in memory on the device;
e) selecting, by the observer, one of the rendered thumbnail graphic images for further magnification; and
e) rendering, from the image in memory on the device, the selected image on the display of the wireless portable device.

* * * * *